(12) United States Patent
Renner et al.

(10) Patent No.: US 6,459,457 B1
(45) Date of Patent: Oct. 1, 2002

(54) ADAPTIVE COLOR COMB FILTER

(75) Inventors: Karl Renner, Dallas; Weider Peter Chang, Hurst, both of TX (US); Walter Demmer, Nuremberg (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/467,953

(22) Filed: Dec. 21, 1999

(51) Int. Cl.[7] .............................. H04N 9/78; H04J 9/66
(52) U.S. Cl. ........................................ 348/668; 348/638
(58) Field of Search ................................ 348/663–670, 348/638, 624, 630, 631

(56) References Cited

U.S. PATENT DOCUMENTS 5,973,253 A * 10/1999 Huetter ........................ 348/663

FOREIGN PATENT DOCUMENTS

GB          2066615 A  *  7/1981 ............ H04N/9/02

* cited by examiner

*Primary Examiner*—Victor R. Kostak
(74) *Attorney, Agent, or Firm*—W. James Brady; Frederick J. Telecky, Jr.

(57) ABSTRACT

A color comb filter (46), video decoder (40) and method for separating chroma (U,V) and luma (Y) signals from a composite video signal (41). The comb filter (46) includes circuitry (48) for generating color filter selections for filtering a chroma video signal (41) and control logic (62) for determining the filter selections based on color boundary properties of the chroma video signal (U,V). The video decoder (40) includes a comb filter (46), a demodulator (42), low pass filter (44), a remodulator (48) and a subtractor (50). The filtered, remodulated chroma signal ($U_{out}, V_{out}$) is subtracted from the composite video signal (41) to produce a luma signal absent hanging dots and false colors.

16 Claims, 12 Drawing Sheets

ADAPTIVE COLOR COMB FILTER

TECHNICAL FIELD OF THE INVENTION

This invention relates generally to the field of television, and more particularly to a system and method of separating luminance and chrominance signals from a composite video signal.

BACKGROUND OF THE INVENTION

A television (TV) operates by displaying video images in response to a composite video signal received from a TV station or Video Cassette Recorder (VCR), for example. The composite video signal comprises both luminance (luma) and chrominance (chroma) information. The luma portion contains the black-and-white TV signal information, and the chroma portion contains the color TV signal information.

There are two standards for video signals commonly in use today, one being the National Television Standards Committee (NTSC) which is used in the United States and Japan. An ideal frequency spectrum for luma (Y) and chroma (C) information in a composite NTSC video signal is shown in FIG. 1a. In NTSC, the chroma phase shift is 180 degrees between the same pixel or two consecutive lines. Another standard for video signals is Phase Alternating Lines (PAL), used in Europe. An ideal frequency spectrum for luma (Y) and chroma (C) information in a composite PAL video signal is shown in FIG. 1b. In PAL, the chroma phase shift is approximately 270 degrees from line to line. Vertical and horizontal synchronization signals also occupy the lower portion of the frequency spectrum in both standards, not shown.

In the NTSC standard, the chroma signal is added to the composite video signal by superimposing a 3.579545 MHz sine wave onto the standard black and white (luma) signal. After the horizontal sync pulse, 9 cycles of a 3.579545 MHz sine wave are added as a color burst. Following these 9 cycles, a phase shift in the chrominance signal indicates the color to display. The amplitude of the signal determines the saturation. A black and white TV filters out and ignores the chrominance signal, whereas a color TV separates the chrominance signal out of the composite video signal and decodes it, along with the normal intensity signal, to determine how to modulate the three color beams of the TV set.

When received by a color TV set, the composite video signal is typically input to a video decoder, which separates the luma and chroma information, and applies gain and offset factors to them in order to map them to a standard output range. A problem arises from luma Y frequencies that fall near the chroma subcarrier frequency $f_{sc}$: false color can be demodulated and output from the video decoder. This problem can be seen around sharp contours in text characters and horizontal and diagonal lines. Another problem that can occur is hanging dots where two different colors are adjacent to one another horizontally.

What is needed is a device and method for eliminating false colors and hanging dots in video signals to produce a clearer TV image.

SUMMARY OF THE INVENTION

The present invention achieves technical advantages as an adaptive comb filter and method of separating chroma from a composite video signal to provide a luma signal having no false colors and hanging dots. Color boundaries of the composite video signal are analyzed to select an optimal comb filter. The comb filter outputs are generated by averaging the pixels from the current line with corresponding pixels from previous lines. False color is distinguished and cancelled by averaging the selected successive lines.

In one embodiment, disclosed is a color comb filter including circuitry for generating color filter selections for filtering a chroma video signal, and control logic adapted to determine the filter selections. The filter selections are determined based on color boundary properties of the chroma video signal to eliminate hanging dots and false colors problematic in the prior art.

In another embodiment, disclosed is a video decoder having a demodulator adapted to separate a chroma signal from a composite video signal, a comb filter coupled to the demodulator adapted to filter the chroma signal based on color boundary properties of the chroma signal, and a subtractor coupled to the comb filter. The filtered chroma signal is subtracted from the composite video signal to produce a luma signal absent of hanging dots and false colors of the prior art.

Also disclosed is a method of separating luma and chroma signals from a composite video signal, including the steps of demodulating the composite video signal to generate a chroma signal, low pass filtering the chroma signal to remove first and second harmonics from the chroma signal, and color comb filtering the chroma signal based on color boundary properties of the composite video signal. The filtered chroma signal is remodulated and then subtracted from the composite video signal to produce a luma signal.

The present invention is advantageous in providing an adaptive comb filter capable of filtering chroma from a composite video signal to produce a luma signal absent false colors and hanging dots problematic in the prior art. The present comb filter may be used in both NTSC and PAL video systems, whereas prior art comb filters were typically designed for one particular standard. False color may be distinguished and cancelled by averaging successive lines. Color boundaries within a 3×3 pixel window are recognized and a 2-line or delayed chroma input is selected such that hanging dot artifacts do not occur. The invention has user-programmable modes of operation, which include the choice of two different three line comb filter coefficients and the choice of a 2-line or no comb when a color boundary is present. The present invention also has programmable thresholds, which affect color boundary detection.

BRIEF DESCRIPTION OF THE DRAWINGS

In the drawings, which form an integral part of the specification and are to be read in conjunction therewith.

Like numerals and symbols are employed in different figures to designate similar components in various views unless otherwise indicated.

DETAILED DESCRIPTION OF PREFERRED EMBODIMENTS

Figure 1A:
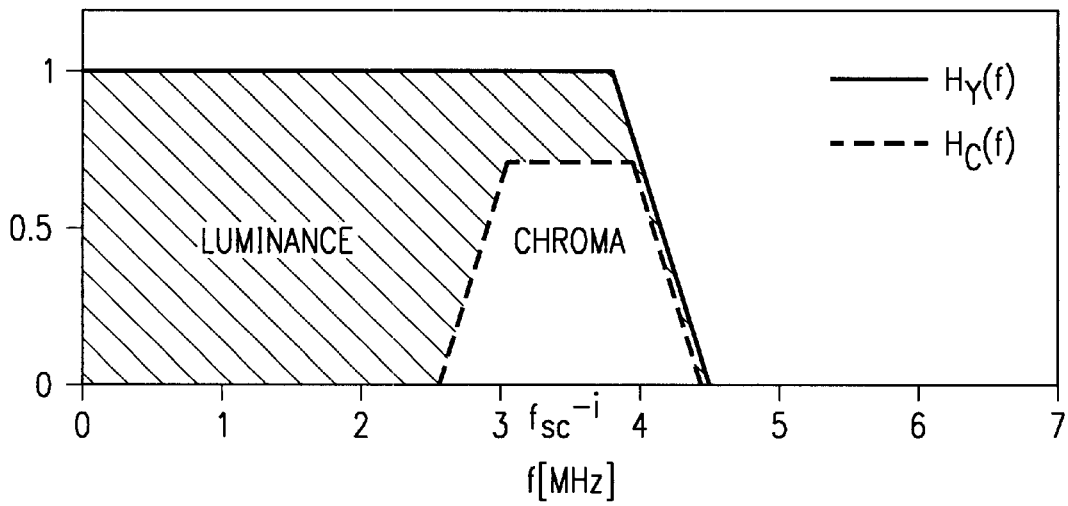
FIG. 1a illustrates an ideal frequency spectrum for luma (Y) and chroma (C) information in a composite NTSC video signal.
Figure 1B:
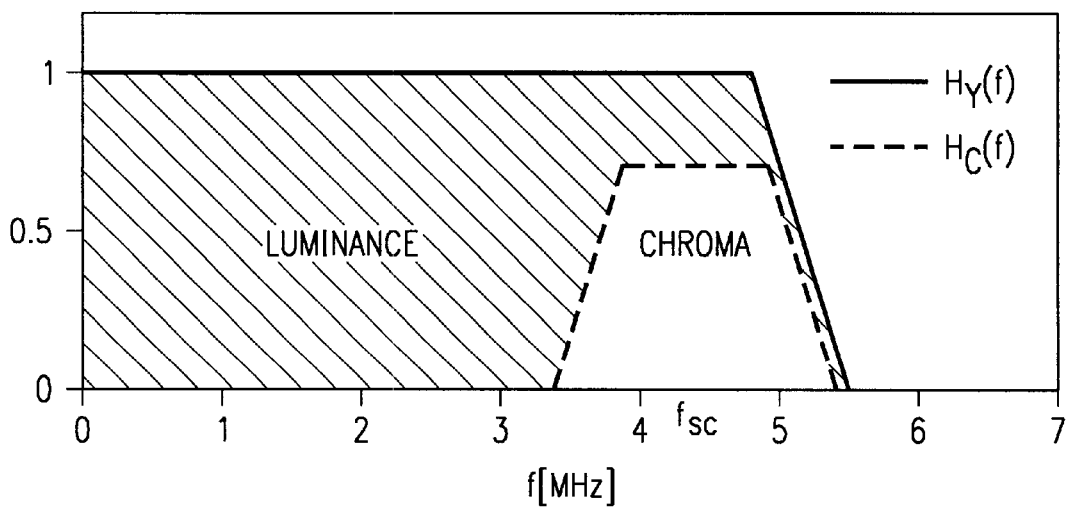
FIG. 1b illustrates an ideal frequency spectrum for luma (Y) and chroma (C) information in a composite PAL video signal.

In prior art analog TV's, separation of luminance and chrominance components from the composite video signal was achieved by a chroma notch and a chroma bandpass filter, respectively. As both filters operate in horizontal direction only, necessitating a rather crude selectivity, the entire frequency band utilized for chroma had to be suppressed in the luminance channel, and vice versa, resulting in severe limitations of luminance bandwidth. Due to limited selectivity properties, this prior art approach resulted in "false colors" being shown on black and white images.

With the introduction of line stores, or line delays, vertical filters became feasible, too. Such vertical filters possess a frequency characteristic that resembles a comb structure and hence, they became known as comb filters. Dependent on coefficients, these comb filters are characterized by repetitive spectral maxima at integer multiples of the line frequency interleaved by minima at odd integer multiples of half the line frequency, and vice versa. For typical spectra of the composite NTSC signal, where the spectral energy of the luminance signal is mainly concentrated around integer multiples of the line frequency with the spectrum of the chrominance signal interleaved half way, comb filters established a considerable bandwidth improvement over the combination of chroma notch and chroma bandpass filters.

Originally in the PAL system, vertical filters were utilized for reducing or eliminating the decoder's sensitivity to "differential phase" and "differential gain" errors. Separation of the luminance and the chrominance components was still achieved by means of horizontal filters (chroma bandpass and chroma notch). With the introduction of digital video signal processing principles, utilization of the vastly increased selectivity properties of vertical filters (comb filters) was exploited for separation of luminance and chrominance components occupying the same range of frequencies, too. Yet, the advantages of these comb filters in terms of increased luminance bandwidth as well as a reduction of certain "false colors" is partially counterbalanced by introduction of a new to artifact that has become known as the "hanging dot" effect. These "hanging dots" occur at vertical color transitions, or horizontal color edges, and are a manifestation of insufficient suppression, or worse, amplification of the color sub-carrier frequency under the condition of colors changing in the vertical direction. Thus, prior art comb filters are ineffective when imagerial contours deviate from straight vertical edges, and at horizontal (colored) edges, turning out chrominance for luminance and vice versa.

Introduced as adaptive comb filters, several solutions have become known in prior art to spatially (locally) reduce the hanging dot effect by means of a combination of horizontal and vertical (comb) filters controlled by spatial image properties. These prior art solutions are similar in that they are either applied to the composite video signal or to both of its components, individually.

Another prior art solution to solving the hanging dot effect is the use of temporal filters. However, temporal filters are not a viable solution because they require large, expensive frame stores. Furthermore, a temporal filter solution is principally plagued by motion artifacts, or contours that have changed position between two successive frames.

Utilizing the complementary nature of the luminance and the chrominance components, the present invention comprises a novel control mechanism for an adaptive comb filter and a novel remodulation scheme for chrominance resulting in optimal separation of luminance and chrominance. The suppression of hanging dots is achieved at the maximally achievable bandwidth for both luma and chroma components with no motion artifacts.

Figure 2A:
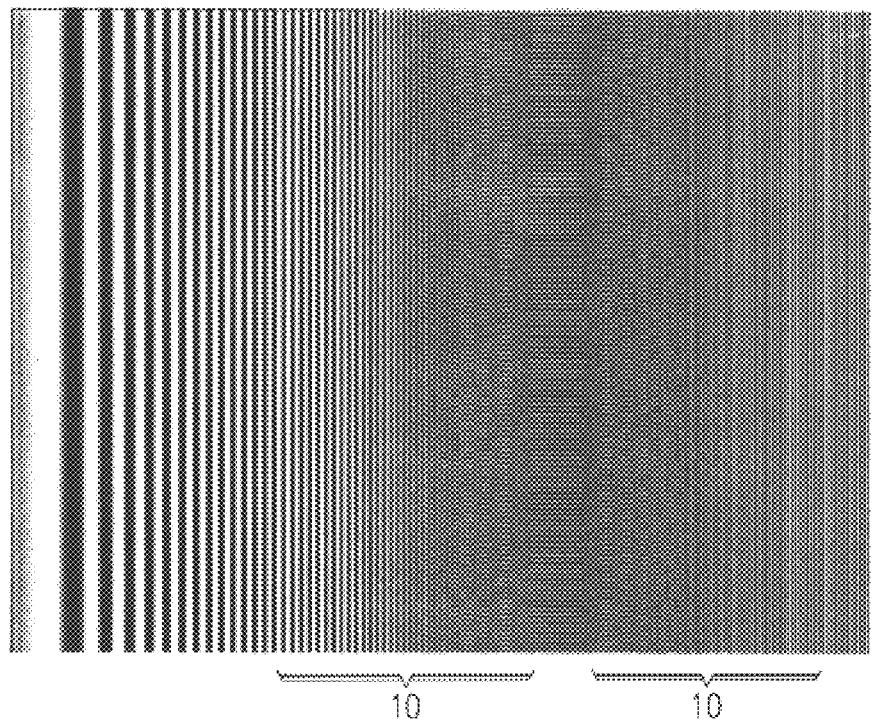
FIG. 2a shows a prior art vertical line pattern with false colors.
Figure 2D:
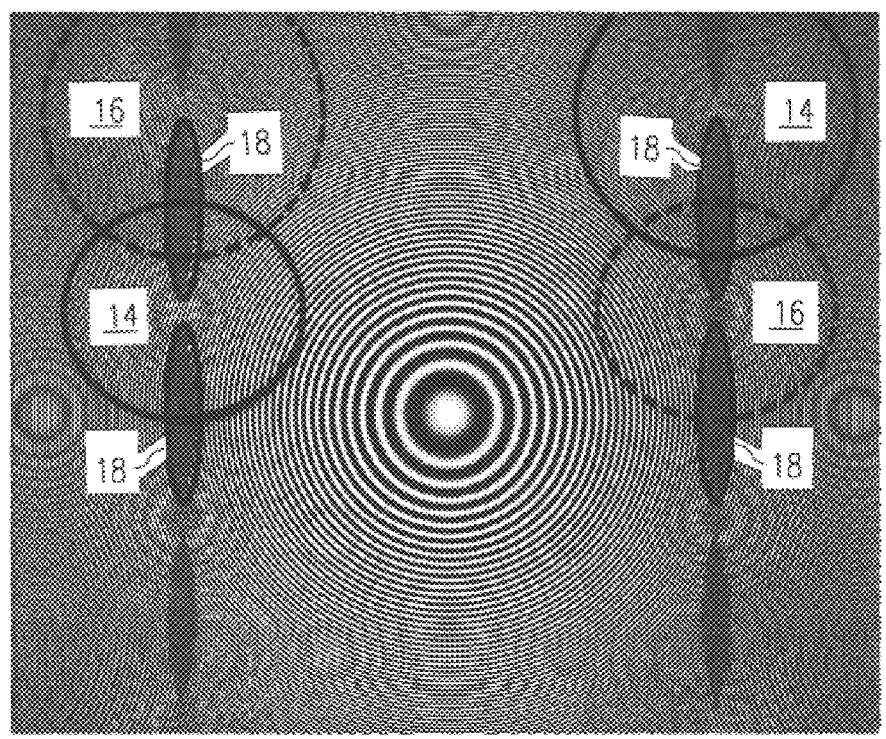
FIG. 2d shows a prior art PAL circle pattern with an incorrect comb filter applied having false colors.
Figure 2B:
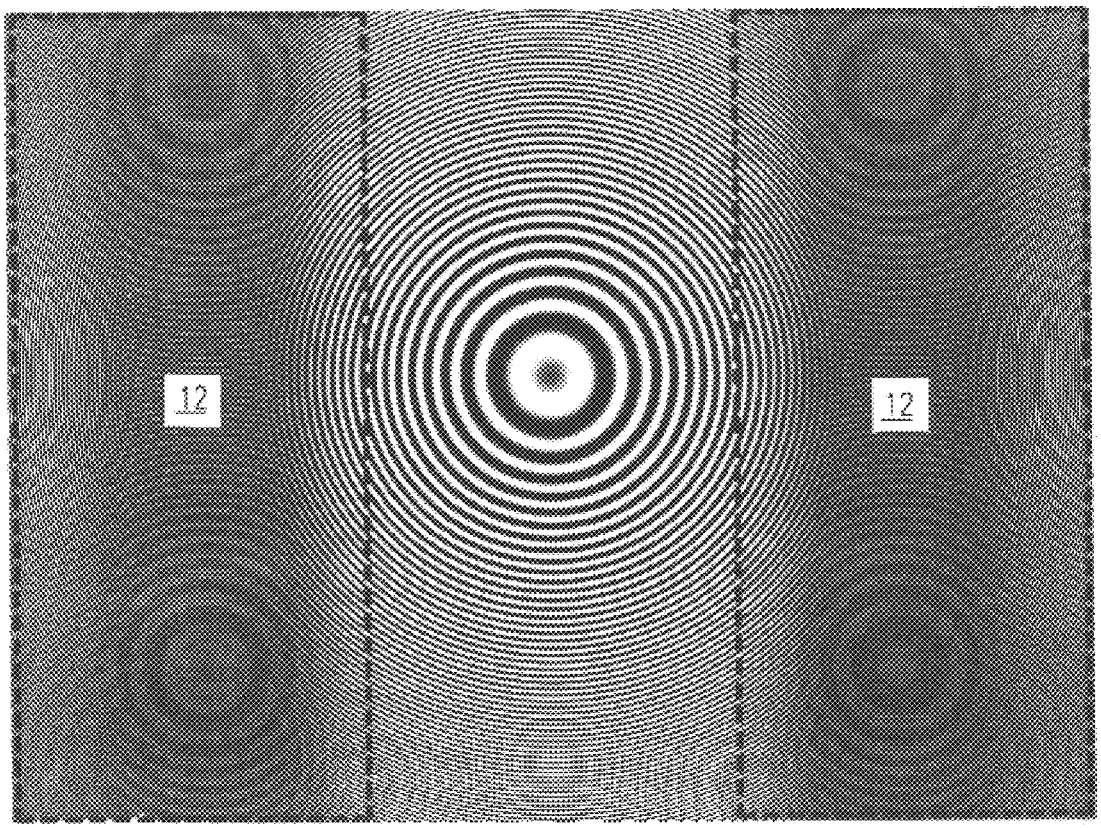
FIG. 2b shows a prior art NTSC circle pattern having false colors.
Figure 2C:
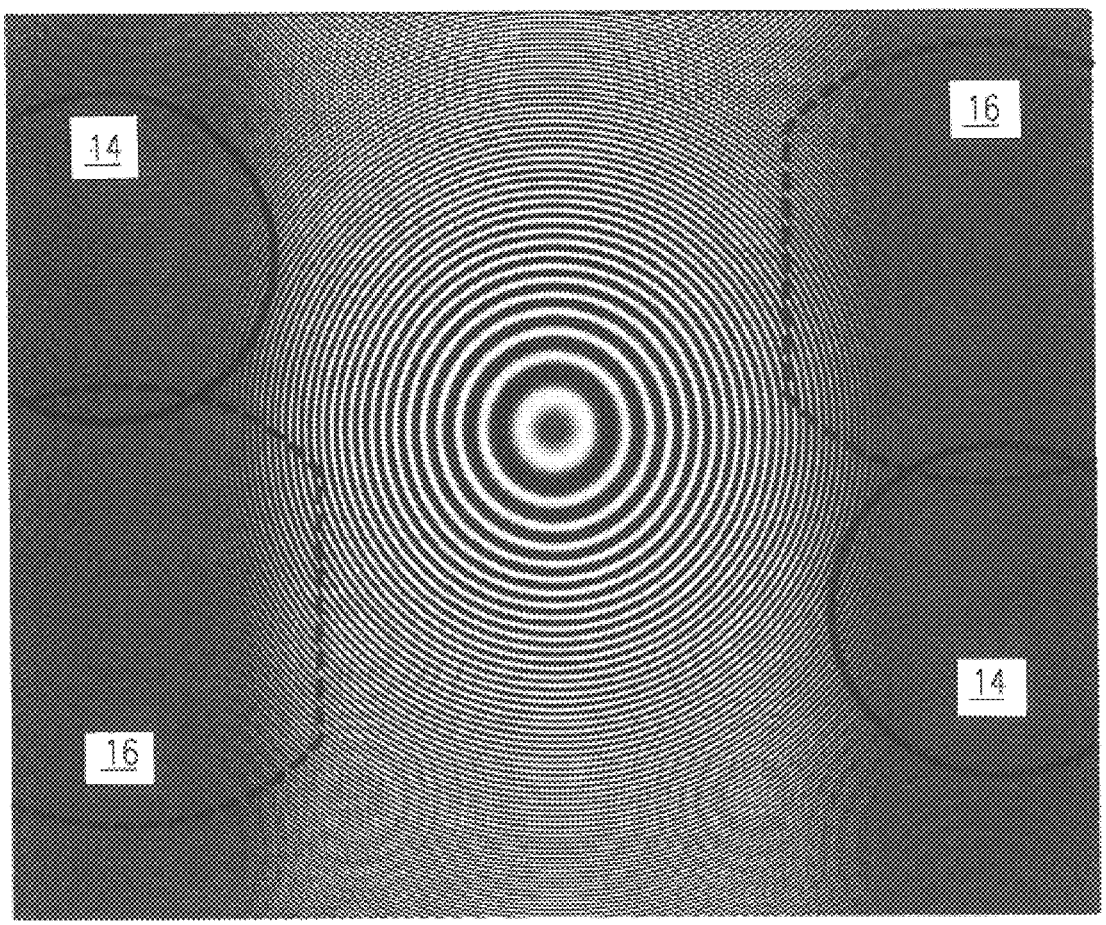
FIG. 2c shows a prior art PAL circle pattern having false colors.
Figure 2E:
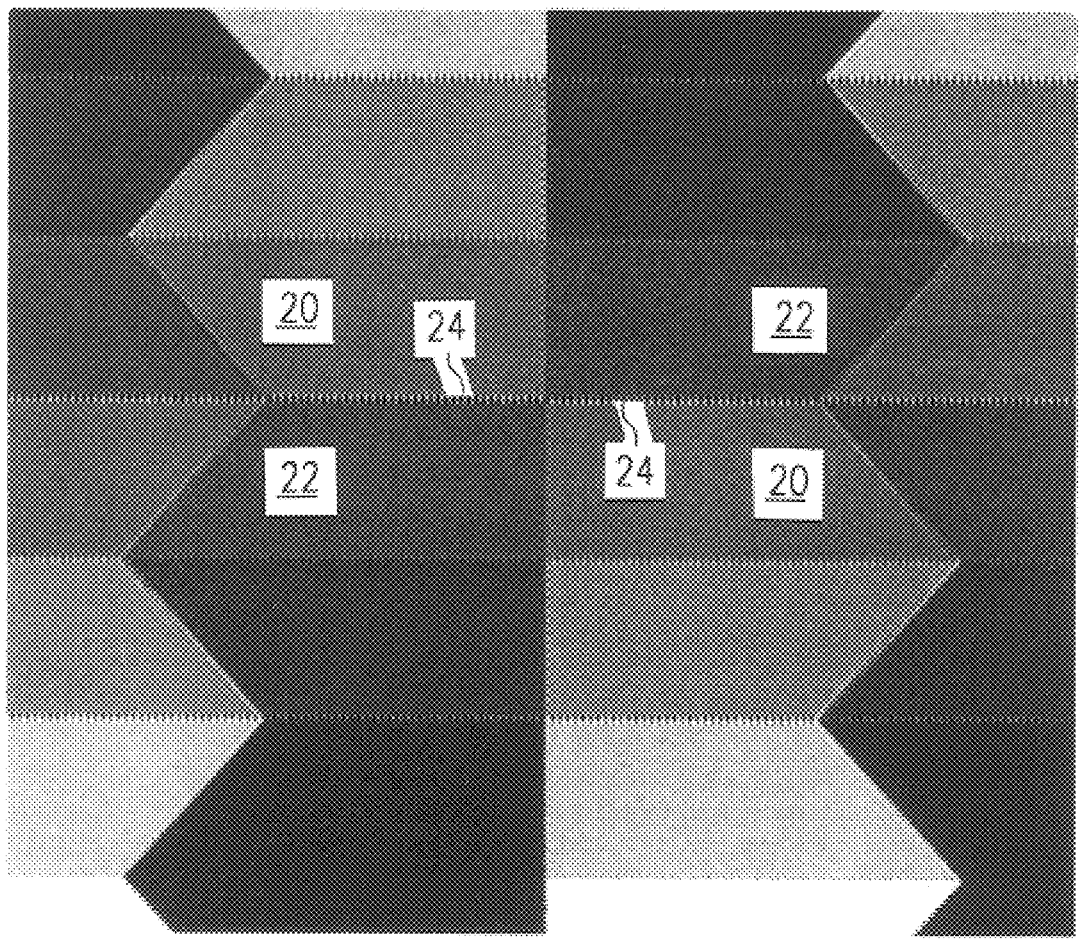
FIG. 2e shows a color bar pattern with a hanging dot effect evident where different colors meet horizontally.

FIGS. 2a–2e are prior art video images illustrating false color and hanging dot problems of the prior art. FIG. 2a shows a prior art vertical line pattern with a series of red vertical lines 10 that appear in the image interspersed with the black and white lines. The luma frequencies vary in horizontal direction only. The red lines 10 are false color: the black and white image should only contain black and white colors. FIG. 2b shows a prior art NTSC circle pattern having false colors that appear as areas 12 of concentric rainbow (red, orange, yellow, green, blue, violet, repeat) circles. The luma frequencies vary in different angular orientations in a circular test pattern. FIG. 2c shows a prior art PAL circle pattern having areas 14 with red and green concentric circles and areas 16 with violet concentric circles. Areas 14 and 16 are false colors. FIG. 2d shows a prior art PAL circle pattern with an incorrect comb filter applied having the red and green circles 14 and violet circles 16 of FIG. 2c, plus more false colors 18 which comprise elliptical regions of horizontal red, green and violet lines. As in FIG. 2a, FIGS. 2b–2d should appear as black and white images without any other colors visible. FIG. 2e illustrates a color bar pattern with a hanging dot effect evident where different colors meet horizontally. For example, color green 20 adjacent color magenta 22 is separated by a series of hanging dots 24. Advantageously, the false colors and hanging dots shown in FIGS. 2a–2e are eliminated by the use of the present invention.

Figure 3A:
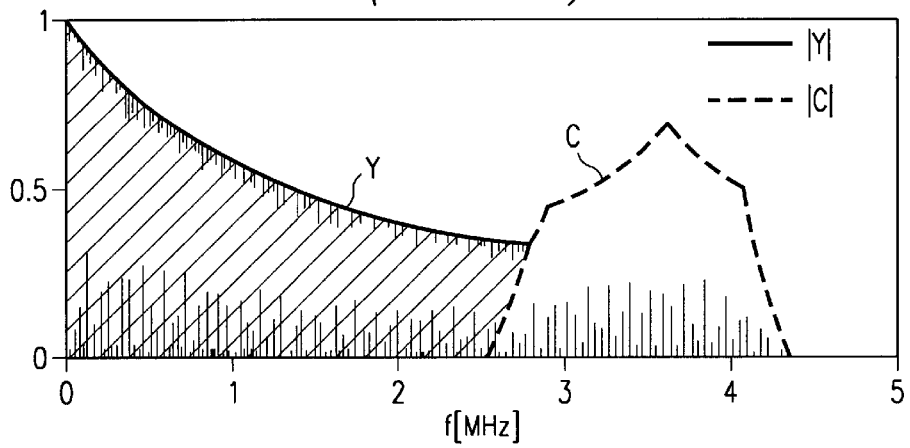
FIG. 3a illustrates a typical power spectrum of a composite NTSC video signal.
Figure 3B:
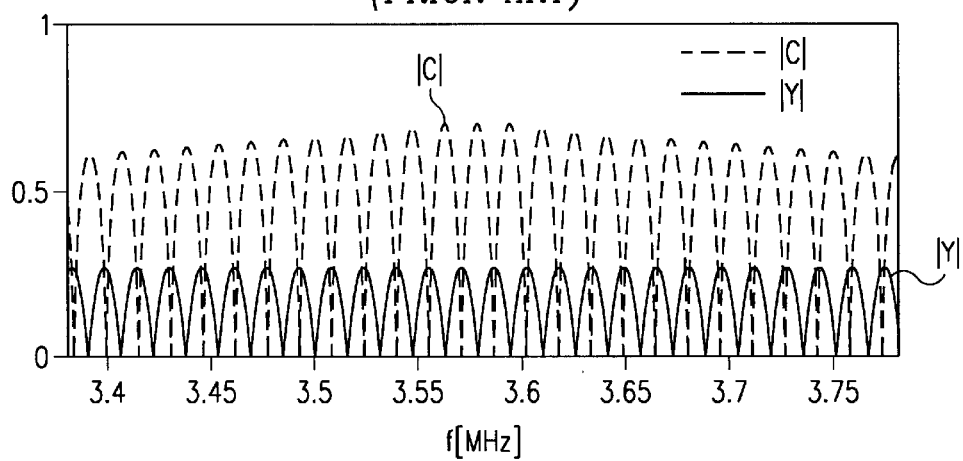
FIG. 3b shows details of a typical power spectrum of composite NTSC video signal in the vicinity of color sub-carrier frequency.
Figure 3C:
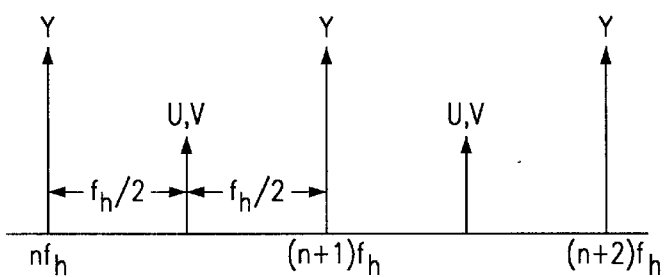
FIG. 3c shows more details of luma/chroma interlaced frequency spectrum for NTSC.

FIGS. 3a–c illustrate a more detailed view of the video signal frequency spectrum for the NTSC standard. FIG. 3a illustrates a typical power spectrum of a composite NTSC video signal. FIG. 3b shows details of a typical power spectrum of composite NTSC video signal in the vicinity of color sub-carrier frequency. FIG. 3c shows more details of luma/chroma interlaced frequency spectrum for NTSC, with U and V being the color or chroma components. A line spectrum is apparent where the spectral energy of the luma Y occurs at integer multiples of the line frequency (15734 Hz for NTSC). The spectral peaks for chroma C are interlaced between the peaks of luma Y and fall halfway between the luma Y peaks.

Figure 4:
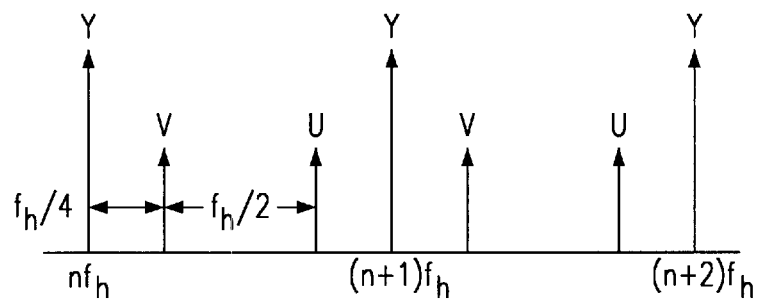
FIG. 4 shows the frequency spectrum for PAL.

The PAL standard has the frequency spectrum shown in FIG. 4 where luma Y is spaced at integer multiples of $f_h$. Due to the frequency relationship between the color subcarrier and the horizontal frequency [$f_{sc}=(283.75+1/625)*f_h$], the chroma U component is positioned about a quarter of a line from the luma Y component. Due to the phase alternation of the chroma V component, the V component is spectrally spaced a half line from the chroma U component in PAL.

The composite video signal is usually demodulated to produce two color difference signals (U and V). Colors can be defined on a vector diagram where U and V represent the axes. The vector diagram rotates at a frequency corresponding to the color subcarrier frequency.

Figure 5:
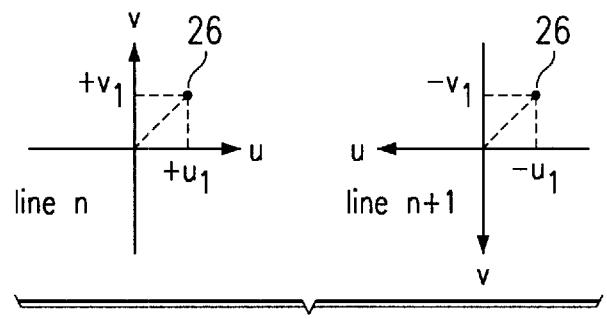
FIG. 5 shows false color demodulation on two consecutive lines for NTSC.

FIG. 5 shows false color demodulation in NTSC represented by the dot 26 on two consecutive lines. Projections onto the U and V axes represent the respective components. The chroma phase shift is 180 degrees between the same pixel on two consecutive lines. The frequency and phase of the false color is assumed to not change from line n to n+1. For NTSC, a two-line comb filter can be used at the output of the low-pass filter to eliminate the false color by averaging the color from lines n and n+1.

Figure 6:
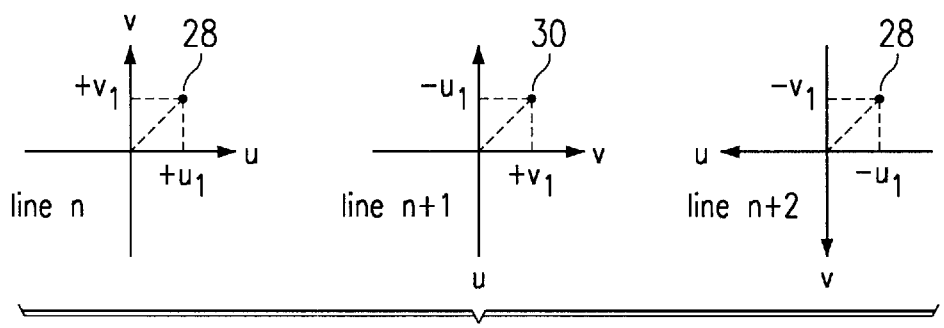
FIG. 6 shows false color demodulation on three consecutive lines for PAL.

FIG. 6 illustrates false color demodulation on three consecutive lines for PAL, where the chroma phase shifts by about 270 degrees (270.576°) from line to line, with false color 28, 30 demodulated. This means that a three-line comb must be used in which lines n and n+2 must be averaged to eliminate false color 28. The false color 30 decoded on line n+1 is not valid data.

Figure 7:
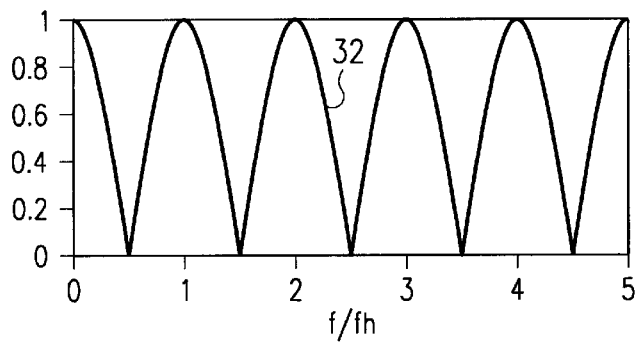
FIG. 7 illustrates transfer function characteristics of a 2-line comb filter for NTSC used in the present invention.
Figure 8:
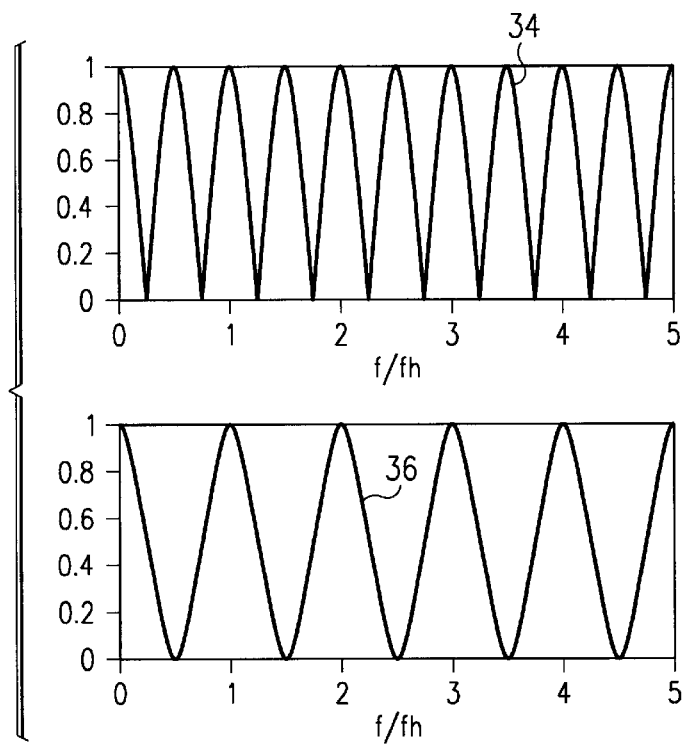
FIG. 8 shows transfer function characteristics of two 3-line comb filters used in the present invention.

The present invention adaptively selects the optimal type of comb filter based on properties of the composite video signal. The transfer function characteristics of the types of comb filters used in the present invention are shown in FIGS. 7 and 8. The comb filters are applied to the composite video signal to filter out the chroma while passing the luma. The transfer function characteristics 32 for a two-line comb filter is shown in FIG. 6, with the filter coefficients shown in parentheses. The two-line comb (½ ½) has the filter transfer function: ½+½*$z^{-1}$ where $z^{-1}$ corresponds to a delay of one horizontal line (sampling frequency=$f_h$=15734.27 Hz for NTSC). The two-line comb filter rejects frequencies halfway between integer multiples of $f_h$. FIG. 8 illustrates two three-line comb filters. The first transfer function 34 having the coefficients (½ 0 ½) serves to eliminate the chroma U and V components and pass luma Y. The second transfer function 36 having the coefficients (¼ ½ ¼) can be used for both NTSC and PAL though it does not completely eliminate the PAL chroma components.

Figure 9:
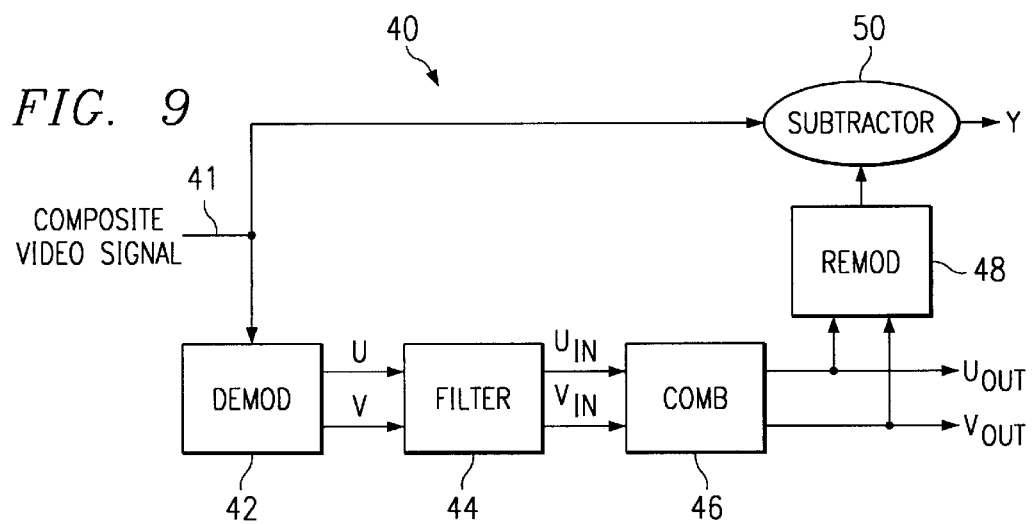
FIG. 9 shows a block diagram of a video decoder utilizing the adaptive comb filter of the present invention.

FIG. 9 shows a block diagram of a video decoder 40 including an adaptive comb filter 46 in accordance with the present invention. A composite video signal 41 is input to a demodulator 42, which separates the two chroma U and V components. The demodulator 42 is coupled to a filter 44 that comprises a low pass filter. The filter 44 is adapted to remove the first and second harmonics of the color subcarrier frequency. The signals at the output of the filter 44 are labeled $U_{in}$ and $V_{in}$, as shown. The filter 44 is coupled to a comb filter 46, which output is labeled $U_{out}$ and $V_{out}$. The comb filter 46 is coupled to a remodulator 48 which is coupled to a subtractor 50. The subtractor 50 is also coupled to the composite video signal 41.

The video decoder 40 utilizes a technique which remodulates the chroma U, V after it has been demodulated and subtracts it from the composite video input to generate luma Y which preserves its original frequency characteristics with no attenuation around the chroma subcarrier frequency $f_{sc}$. The video decoder 40 demodulates the chroma and generates two color difference signals (U and V) which are low pass filtered to remove the first and second harmonic of the color subcarrier frequency. The comb filter 46 in the present invention is applied to the output of the color low pass filter 44. Note that two comb filters 46 may be used, one each for U and V, but preferably only one comb filter 46 is included. Because signals U and V flow at ½ pixel clock rate, they are preferably multiplexed so that only one comb filter 46 is required. The demodulation process involves multiplying the input composite video by the sine and cosine of the color subcarrier $f_{sc}$, which produces sum and difference of the input and local oscillator frequencies. The color low pass filter 44 filters out the sum frequency and passes the difference frequency. The comb 46 processes the output of the color low pass filter and feeds the U and V signals to the remodulator 48, which outputs remodulated chroma equal to ($U_{out}\sin\omega_{sc}t + V_{out}\cos\omega_{sc}t$) to the subtractor 50, where $\omega_{sc}=2\pi f_{sc}$. The subtractor 50 subtracts the remodulated chroma from the composite video signal 41 to produce luma Y.

Figure 10:
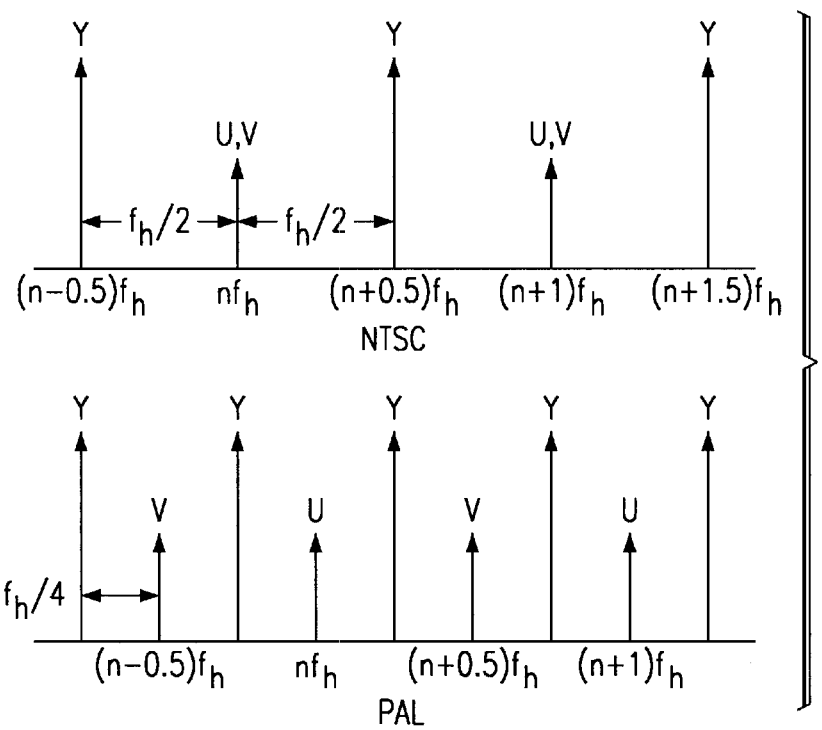
FIG. 10 illustrates a frequency spectrum of video signal at the color low pass filter output.

Since for NTSC $f_{sc}=227.5f_h$ the frequency spectrum shifts by $0.5f_h$, as shown in FIG. 10. Chroma U,V falls at integer multiples of $f_h$, with luma Y interlaced at integer plus half $f_h$ frequency intervals. The 2-line comb of FIG. 7 and the 3-line comb (¼ ½ ¼) of FIG. 8 filter out the luma Y and passes the chroma U,V signals. For PAL, since $f_{sc}=283.75f_h$, the chroma shifts to integer and integer plus one half multiples of $f_h$ while the luma shifts to integer plus one fourth and integer plus three fourths of $f_h$. The comb filter (½ 0 ½) of FIG. 8 will pass the chroma U, V and trap the luma Y.

In the prior art, luma Y is separated from the composite video signal 41 by using a chroma trap filter which blocks the color subcarrier frequency $f_{sc}$. Unfortunately luma Y frequencies near the color frequency are attenuated which may result in a degraded picture resolution. To prevent this, a better technique called chroma remodulation is utilized by the video decoder 40 in accordance with the present invention. Demodulated chroma is low pass filtered to remove the first and second harmonics of the color subcarrier frequency and is then remodulated. This remodulated chroma is then subtracted from the composite video input 41 to cancel the chroma U,V and produce luma Y. This technique produces a very sharp picture with good resolution because the luma Y frequencies near the color frequency are not attenuated. A hazard exists when a color boundary occurs and the 2- or 3-line comb filter averages two different colors to produce a false color. If this false color is not eliminated properly then it can produce a hanging dot pattern in the luma output by the remodulation process.

Figure 11:
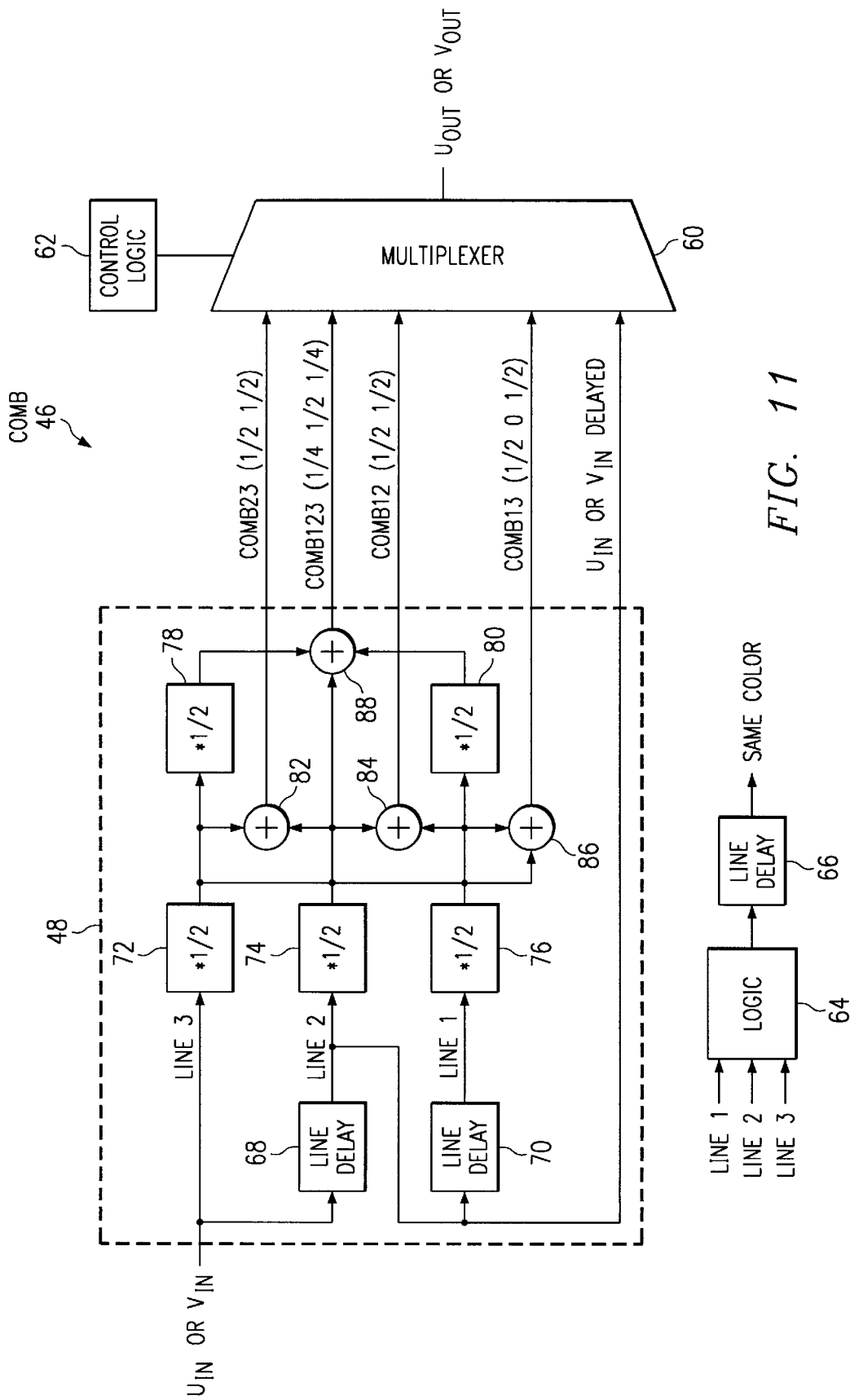
FIG. 11 illustrates a schematic of a preferred embodiment of the present comb filter architecture.

A preferred architecture of the comb filter 46 of the present invention is shown in FIG. 11. Circuit 48 is adapted to generate color filter selections for filtering the chroma video signal $U_{in}$ or $V_{in}$. The outputs of circuit 48 are coupled to a multiplexer 60 that is controlled by control logic 62 which selects which color filter selections to output at $U_{out}$ or $V_{out}$. The circuit 48 of the present comb filter 46 preferably comprises a plurality of line delays 68, 70 coupled to a plurality of multipliers 72, 74, 76, 78, 80 coupled to a plurality of adders 82, 84, 86m 88. The arrangement shown is preferred although other circuits may be utilized to produce the desired outputs comb23, comb123, comb12, comb13, and $U_{in}$ or $V_{in}$ delayed. These selection outputs are input to multiplexer 60 which outputs one selection to signal $U_{out}$ and $V_{out}$ according to the instructions provided by control logic 62, to be discussed further herein. Multipliers 72, 74, 76, 78, 80 preferably multiply the signal $U_{in}$ or $V_{in}$ by ½. More preferably, multipliers 72, 74, 76, 78, 80 comprise right-shifting the data word by one bit. The line delays 68 and 70 preferably comprise a 10-bit wide shift register. The line delays 68 and 70 may alternately comprise a circular buffer memory although this may be more costly to implement.

The comb filter 46 is also adapted to produce a "same color" selection. Signals line2 and line1 are generated by line delays 68 and 70, respectively, as shown, which signals are input along with signal line3 to logic circuit 64. The output of logic circuit 64 is coupled to line delay 66, which preferably comprises a 1 bit wide register to generate the same color signal.

Figure 12:
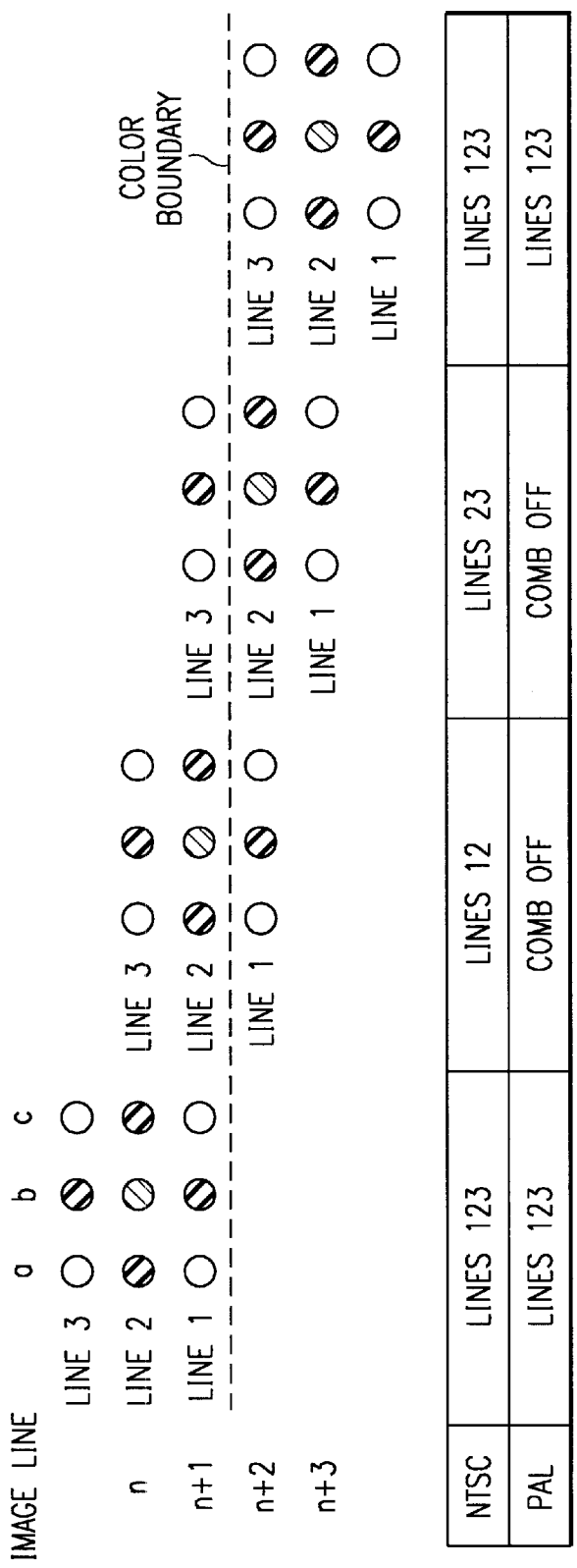
FIG. 12 shows a selection of comb filters based on position of the local window and standard.

Chroma pixels within a local 3×3 window of the image are used by the adaptive comb filter control logic 62 to select a 2-line, 3-line, or no comb filtered output. FIG. 12 shows a 3×3 window centered on the pixel of interest for different positions with respect to a color boundary. If a transition in the color is detected between line 1 and line 3 then a decision is made based on the TV standard (NTSC or PAL). The color boundary in the horizontal dimension within the 3×3 window is detected by computing vertical and horizontal difference between the pixel colors. The pixel color is represented by a vector consisting of its u and v component values. The computed difference values are shown in the following equations:

lines 1&3: vertical difference $13=\text{mag}(u_{1b}-u_{3b}, v_{1b}-v_{3b})$     Eq. 1:

lines 1&2: vertical difference $12=\text{mag}(u_{1b}-u_{3e}, v_{1b}-v_{3e})$     Eq. 2:

lines 2&3: vertical difference $23=\text{mag}(u_{1e}-u_{3h}, v_{1e}-v_{3h})$     Eq. 3:

line2: horizontal difference=$\text{mag}(u_{2a}-u_{2c}, v_{2a}-v_{2c})$     Eq. 4:

The magnitude is computed using the following equation:

$$\text{mag}(x,y)=\text{sqrt}(x^{}2+y^{}2) \quad \text{Eq. 5:}$$

In order to avoid the computational complexity an approximation formula is preferably used for the magnitude.

$$\text{mag}(x,y)=\max(\max(\text{abs}(x),\text{abs}(y)),\max(\tfrac{7}{8}*\text{abs}(x)+\tfrac{1}{2}*\text{abs}(y), 0.5*\text{abs}(x)+\tfrac{7}{8}*\text{abs}(y))) \quad \text{Eq. 6:}$$

Additional parameters used in the boundary decision comprise the vector angle φ between the colors at line 1 pixel b and line 3 pixel b:

$$\cos\phi=(u_{1b}*u_{3b}+v_{1b}*v_{3b})/\text{mag}(u_{1b},v_{1b})*\text{Mag}(u_{3b},v_{3b}) \quad \text{Eq. 7:}$$

The same_color parameter represents the color comparison results for the previous three lines. The criteria for detecting a color boundary in accordance with the present invention are listed in Table 1. The constants P, Q, Ra, Rb, Rc, and S are programmable by the user. The column labeled "variable" is a Boolean variable which can be true or false as evaluated by the expression. The symbol "!" means inverse or "not".

TABLE 1

| variable | represents | expression |
|---|---|---|
| E | strong boundary present | vertical difference 13 >= P * horizontal difference + Q |
| H0a | boundary present | vertical difference 13 >= Ra |
| H0b | boundary present | vertical difference 13 >= Rb |
| H0c | weak boundary present | vertical difference 13 >= Rc |
| H0d | vector angle small | cos φ < S |
| H1a | boundary present between lines 1&2 | vertical difference 12 >= Ra |
| H1b | boundary present between lines 1&2 | vertical difference 12 >= Rb |
| H2a | boundary present between lines 2&3 | vertical difference 23 >= Ra |
| H2b | boundary present between lines 2&3 | vertical difference 23 >= Rb |
| K | specifies boundary location | vertical difference 12 >= vertical difference 23 |
| same color | same color for previous 3 lines | (!H1b)and(!H2b) or ((same_color)and(!H2b)) |

These parameters are combined in a Boolean expression to control comb filter selection:

Eq. 8:

| decision = E | and /* strong boundary */ |
| (H0a or (!H0a)and(H0c)and(H0d)) | and /* boundary or weak boundary and small angle */ |
| ((!H1b)or(!H2b)) | and /* no boundary between lines 1&2 or no boundary between lines 2&3) |
| same_color | /* same color for previous 3 lines */ |

The E parameter detects the presence of color boundaries having different orientations by comparing the vertical difference with the horizontal difference of pixels within the 3×3 window. The constant P sets the angular sensitivity and Q set an absolute threshold which defines a zone around the center pixel within which the comb is disabled. Table 2 illustrates E as a function of boundary angles.

TABLE 2

| angle | P = 0<br>Q = 0 | 1<br>0 | 4<br>0 | 4<br>150 |
|---|---|---|---|---|
| 0 | 1 | 1 | 1 | 0 |
| 45 | 1 | 1 | 0 | 0 |
| 90 | 1 | 0 | 0 | 0 |
| 135 | 1 | 1 | 0 | 0 |
| 180 | 1 | 1 | 1 | 0 |
| 225 | 1 | 1 | 0 | 0 |
| 270 | 1 | 0 | 0 | 0 |
| 315 | 1 | 1 | 0 | 0 |

The thresholds Ra, Rb, and Rc are used to detect horizontal boundaries corresponding to the H0, H1, and H2 Boolean variables. K is used to locate a boundary which has been detected between lines 1 and 3. The same color variable represents the color history of the previous lines and is used to eliminate false color. S is a fractional number close to but less than 1. If the two colors are nearly the same then the vector angle φ will be close to zero and cos φ will be close to 1. Table 3 lists the parameters for different positions of the 3×3 window in FIG. 12 where a horizontal color boundary is present. Note that 1 means true and 0 false. H0=1 signals the presence of a color boundary and K specifies the location.

TABLE 3

| image line | E | H0 a b c d | H1 a b | H2 a b | same color | decision | K | NTSC comb | PAL comb | color boundary |
|---|---|---|---|---|---|---|---|---|---|---|
| n | 1 | 0 0 0 0 | 0 0 | 0 0 | 1 | 0 | 1 | 123 | 123 | none |
| n + 1 | 1 | 1 1 1 1 | 1 1 | 0 0 | 1 | 1 | 1 | 23 | no | 1 & 2 |
| n + 2 | 1 | 1 1 1 1 | 0 0 | 1 1 | 1 | 1 | 0 | 12 | no | 2 & 3 |
| n + 3 | 1 | 0 0 0 0 | 0 0 | 0 0 | 0 | 0 | 1 | 123 | 123 | none |

Figure 13:
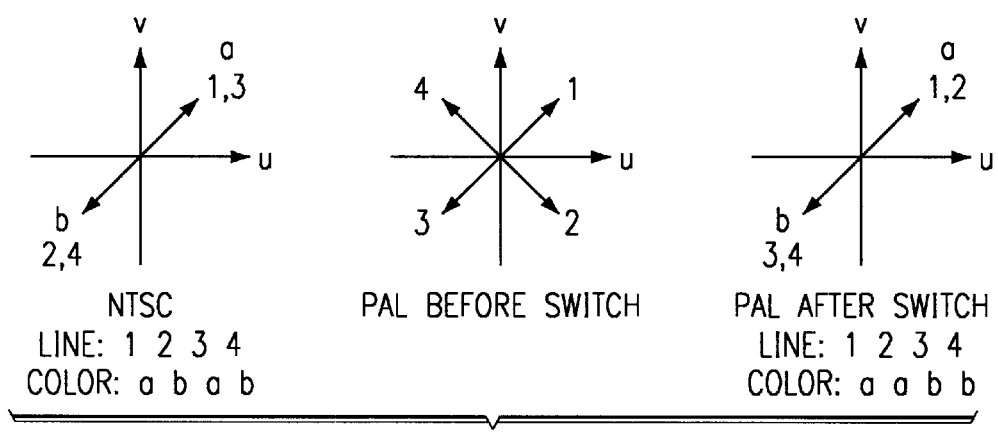
FIG. 13 illustrates false color vectors for successive lines.

The same color parameter keeps track of the color history for the previous lines and is used to eliminate false color in PAL. False color due to luma frequencies near the chroma frequency results in the vectors for successive lines 1,2,3, and 4 shown in FIG. 13: the chroma u and v axes correspond to a fixed reference. For NTSC, the false color vector phase switches 180 degrees in phase from line to line, resulting in two vector positions. For PAL, the false color switches 270 degrees in phase from line to line, resulting in the center vector diagram before the PAL switch of the v component. The PAL after switch results in the two vector positions in the right vector diagram.

Table 4 illustrates the same color variable for NTSC. When false color occurs the decision is 0 due to H0a=0 as well as same color=0. Table 5 illustrates the false color case for PAL where there is a boundary between black and false color. When false color occurs, the decision is 0 due only to same color=0.

TABLE 4

| line | Color | E | H0 a b c d | H1 a b | H2 a b | same color | decision | K | comb select | Comment |
|---|---|---|---|---|---|---|---|---|---|---|
| n | black | 1 | 0 0 0 0 | 0 0 | 0 0 | 1 | 0 | 1 | 123 | average black for lines 123 |
| n + 1 | black | 1 | 1 1 1 1 | 1 1 | 0 0 | 1 | 1 | 1 | 23 | average black for lines 23 |
| n + 2 | a | 1 | 1 1 1 1 | 1 1 | 1 1 | 1 | 1 | 1 | 23 | average black for lines 23 |
| n + 3 | b | 1 | 0 0 0 0 | 1 1 | 1 1 | 0 | 0 | 1 | 123 | average false color for lines 123 |
| n + 4 | a | 1 | 0 0 0 0 | 1 1 | 1 1 | 0 | 0 | 1 | 123 | average false color for lines 123 |
| n + 5 | b | 1 | 0 0 0 0 | 1 1 | 1 1 | 0 | 0 | 1 | 123 | average false color for lines 123 |

TABLE 5

| line | color | E | H0 a b c d | H1 a b | H2 a b | same color | K | comb select | comment |
|---|---|---|---|---|---|---|---|---|---|
| n | black | 1 | 0 0 0 0 | 0 0 | 0 0 | 1 | 1 | 123 | average black for lines 123 |
| n + 1 | black | 1 | 1 1 1 1 | 1 1 | 0 0 | 1 | 1 | 23 | average black for lines 23 |
| n + 2 | a | 1 | 1 1 1 1 | 0 0 | 1 1 | 1 | 0 | delay | delayed input |
| n + 3 | a | 1 | 1 1 1 1 | 1 1 | 0 0 | 0 | 1 | 1 3 | average false color for lines 1,3 |
| n + 4 | b | 1 | 1 1 1 1 | 0 0 | 1 1 | 0 | 0 | 1 3 | average false color for lines 1,3 |
| n + 5 | b | 1 | 1 1 1 1 | 1 1 | 0 0 | 0 | 1 | 1 3 | average false color for lines 1,3 |

Comb filter selection by control logic 62 is based on the decision and user programmed control bits according to the following Table 6. Comb mode bit 0 is used to specify the use of either a 2 line comb or the line delayed input which is useful for the

TABLE 6

| comb mode 1 | comb mode 0 | decision | K | comb selection | description |
|---|---|---|---|---|---|
| x | 0 | 0 | 0 | 23 | boundary present-use comb23 |
| x | 0 | 0 | 1 | 12 | boundary present-use comb12 |
| x | 1 | 0 | X | in delayed | boundary present-use line delayed input |
| 0 | X | 1 | X | 123 | no boundary present-use comb123 |
| 1 | X | 1 | X | 13 | no boundary present-use comb13 |

NTSC standard. Comb mode bit 1 specifies the use of either comb123 (¼ ½ ¼) or comb13 (½ 0 ½) which is particularly useful for the PAL standard.

Referring again to the comb filter architecture 46 in FIG. 11, the comb filter outputs comb23, comb123, comb12, comb13, and Uin or Vin delayed are generated by averaging the pixels from the current line with the corresponding pixels from previous lines; these are provided by buffers 68 and 70 having a delay equal to a line delay. Since the data rate of the chroma is decimated by a factor of two, the delay is actually one half the number of pixels per line. Same color is a 1 bit Boolean variable which represents the color history of previous lines.

Figure 14:
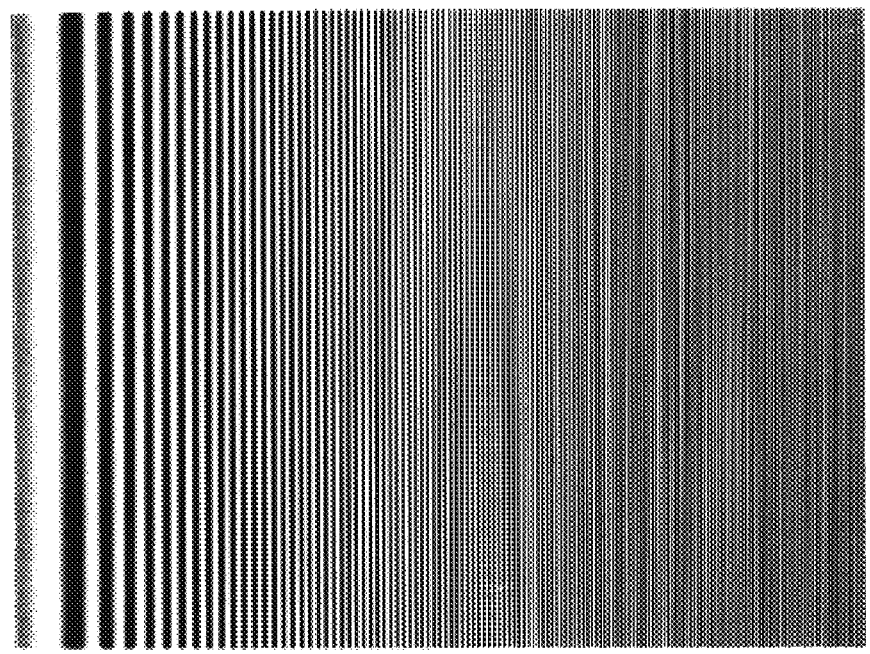
FIG. 14 shows vertical test lines with the use of the present comb filter having no false color.
Figure 15:
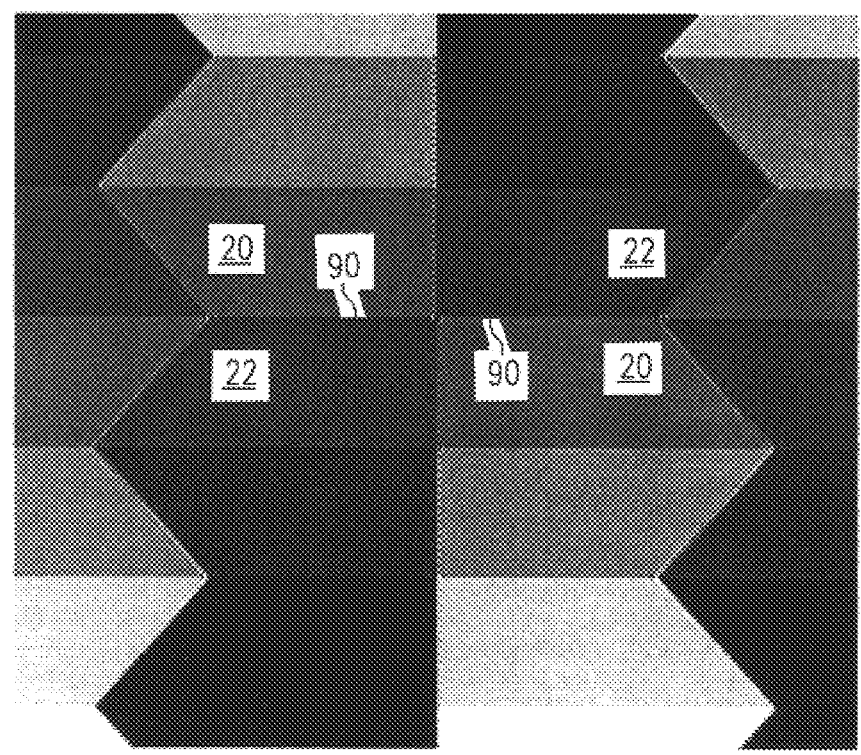
FIG. 15 shows a color bar pattern with the use of the present comb filter, without a hanging dot effect evident where different colors meet.

FIG. 14 shows a vertical line test pattern with the use of the adaptive comb filter 46. The image is absent the false color present in the prior art. Similar results are found for circle test patterns, not shown. FIG. 15 shows a color bar test pattern using a comb filter 46 of the present invention. Note the absence of hanging dots at the adjacent horizontal areas 90 of different colors. Solving the false color and hanging dot problems of the prior art with the present invention results in a video image with crisp edges.

There are several advantages of the adaptive comb filter 46 of present invention. False color may be distinguished and cancelled by averaging optimally selected successive lines. Color boundaries within a 3×3 pixel window are recognized and a 2-line or delayed chroma input is selected such that hanging dot artifacts do not occur. The invention has user-programmable modes of operation, which include the choice of two different three line comb filter coefficients and the choice of a 2-line or no comb when a color boundary is present. Furthermore, the present invention has programmable thresholds which affect color boundary detection.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore the intention that the appended claims be interpreted as broadly as possible in view of the prior art to include all such variations and modifications.

What is claimed is:

1. A color comb filter, comprising:

circuitry for generating a plurality of color filter selections for filtering a chroma video signal, said plurality of color filter selections including comb23, comb123, comb12, comb13 and chroma video signal delayed; and circuitry for selecting one of said plurality of color filter selections based on color boundary properties of said chroma video signal.

2. The color comb filter of claim 1 wherein pixels of successive lines of said chroma video signal are averaged to eliminate false color.

3. The color comb filter of claim 2 wherein said control logic comprises programmable thresholds affecting color boundary detection.

4. The color comb filter of claim 1 wherein both NTSC and PAL signals are filterable.

5. The color comb filter of claim 1 in which said circuitry for selecting comprises:

a multiplexer for receiving said plurality of color filter selections; and control logic for generating a control signal based on color boundary properties of said chroma video signal, said multiplexer responsive to said control signal to output a selected one of said plurality of color filter selections as a chroma video signal.

6. A video decoder, comprising:

a demodulator adapted to separate a chroma signal from a composite video signal;

a comb filter coupled to said demodulator adapted to filter said chroma signal based on color boundary properties of said chromal signal;

a subtractor coupled to said comb filter, said subtractor adapted to subtract said filtered chroma signal from said composite video signal to produce a luma signal;

a remodulator coupled between said comb filter and said subtractor; and a low pass filter coupled between said demodulator and said comb filter, said low pass filter adapted to remove first and second harmonics from said chroma signal.

7. The video decoder of claim 6 wherein said comb filter comprises:

circuitry for generating color filter selections for filtering said chroma video signal;

a multiplexer coupled to said circuitry adapted to produce an output chroma video signal from said color filter selections; and control logic adapted to determine said filter selections and communicate said selections to said multiplexer, wherein said filter selections are determined based on color boundary properties of said chroma video signal.

8. The video decoder of claim 7 wherein said comb filter circuitry comprises a plurality of line delays coupled to a plurality of multipliers and a plurality of adders.

9. The video decoder of claim 8 wherein said color filter selections are selected from the group consisting of:

comb23, comb123, comb12, comb13 and chroma video signal delayed.

10. The video decoder of claim 6 wherein pixels of successive lines of said chroma video signal are averaged to eliminate false color.

11. The video decoder of claim 6 wherein said control logic comprises programmable thresholds affecting color boundary detection.

12. The video decoder of claim 6 wherein both NTSC and PAL signals are filterable.

13. A method of separating luma and chroma signals from a composite video signal, comprising the steps of:

demodulating said composite video signal to generate a chroma signal;

low pass filtering said chroma signal to remove first and second harmonics from said chroma signal;

color comb filtering said chroma signal based on color boundary properties of said composite video signal;

remodulating said filtered chroma signal; and subtracting said filtered chroma signal from said composite video signal to produce a luma signal.

14. The method of claim 13 wherein said step of color comb filtering comprises selecting color filter selections from the group consisting of:

comb23, comb123, comb12, comb13 and chroma video signal delayed.

15. The method of claim 13 wherein said step of color comb filtering comprises averaging pixels of successive lines of said chroma video signal to eliminate false color.

16. The method of claim 13 wherein said step of color comb filtering comprises referring to preprogrammed thresholds affecting color boundary detection.

* * * * *